United States Patent [19]

Herbst

[11] Patent Number: 5,256,364
[45] Date of Patent: Oct. 26, 1993

[54] PROCESS FOR DEMOLDING A MOLDED PART AS WELL AS A DEVICE FOR CARRYING OUT THE PROCESS

[76] Inventor: Richard Herbst, Freisinger Strasse 3b, 8057 Eching, Fed. Rep. of Germany

[21] Appl. No.: 917,123

[22] PCT Filed: Feb. 5, 1991

[86] PCT No.: PCT/EP91/00220
§ 371 Date: Aug. 3, 1992
§ 102(e) Date: Aug. 3, 1992

[87] PCT Pub. No.: WO91/11313
PCT Pub. Date: Aug. 8, 1991

[30] Foreign Application Priority Data
Feb. 5, 1990 [DE] Fed. Rep. of Germany ....... 4003371

[51] Int. Cl.⁵ .................... B29C 45/40; B29C 45/42
[52] U.S. Cl. .................................. 264/334; 425/556; 425/438; 425/444
[58] Field of Search ...................... 264/334, 336; 425/436 R, 438, 441, 444, 554, 556

[56] References Cited
FOREIGN PATENT DOCUMENTS

| | | |
|---|---|---|
| 1145783 | 3/1963 | Fed. Rep. of Germany . |
| 2519411 | 11/1975 | Fed. Rep. of Germany . |
| 61-035214 | 2/1986 | Japan . |
| 61-195817 | 8/1986 | Japan . |
| 62-104723 | 5/1987 | Japan . |
| 62-197261 | 8/1987 | Japan . |
| 63-224853 | 9/1988 | Japan . |
| 1-263018 | 10/1989 | Japan . |

Primary Examiner—Jill L. Heitbrink
Attorney, Agent, or Firm—Chilton, Alix & Van Kirk

[57] ABSTRACT

When removing a molded part (7), particularly from an injection mold, the part is moved to an intermediate position in a first partial movement (a) at low speed, then to the final position in a second partial movement (b) at higher speed. The first partial movement (a) can take place while the injection mold is opening and/or while a gripping tool (14) or handling device is being introduced. The injection mold used in the process has pressure operated stops (21) which act on the front face of an ejection plate (13) and hold it in the intermediate position or release it for the second partial movement (b) to take place.

7 Claims, 3 Drawing Sheets

PROCESS FOR DEMOLDING A MOLDED PART AS WELL AS A DEVICE FOR CARRYING OUT THE PROCESS

The invention relates to a process for demolding a molded part from a mold of the type specified in the preamble of claim 1, as well as a device for carrying out the process.

In principle, the invention can be used in the case of all molding processes in which a molded part of any material is molded in a mold and is then removed from the opened mold; preferred area of application is the production of plastics molded parts by injection molding. The complete sequence of demolding a molded part comprises the opening of the mold, the moving-in of a gripping tool, which belongs to a handling unit, robot, manipulator or the like, between the opened mold halves, the ejection of the molded part by means of the ejector elements from the one mold half until gripping by the gripping tool, and the subsequent moving of the gripping tool with the gripped molded part out of the area of the mold. To be able to operate the molding machine, for example an injection-molding machine, with as high a number of cycles as possible, the said demolding operations should proceed at the greatest possible speed. The ejection speed at which the molded part is moved out of the mold half is, however, assigned limits, since an excessive ejection speed can result in the molded part being damaged. This applies in particular in the case of molded parts of large surface area, in the case of which great forces of adhesion and suction occur between the molded part and the corresponding mold walls. The risk of damage also depends on how thin-walled the workpiece is and at how many points it is gripped and supported by the ejector elements. The ejection of the molded part must be performed in such a way that it is not damaged, in particular by overcoming the adhesion between the molded part and the mold walls, and by accelerating the molded part. Here the ejection must be performed slowly enough to avoid an unacceptably high negative pressure between molded part and mold walls.

The invention is based on the object of specifying a process and a device by which the entire demolding operation can be carried out in a shorter time, but nevertheless without unacceptable stressing of the molded part.

This object is achieved according to the invention by the process specified in claim 1. The subclaims specify further advantageous features of the process according to the invention and a device for carrying out the process.

Since, in the case of the process according to the invention, the molded part is only moved into an intermediate position in the first partial stroke, in particular such a position in which it does not hinder the moving-in movement of the gripping tool, this first partial stroke can be commenced before the moving-in of the gripping tool and even before completion of the opening movement of the mold. Consequently, an adequate time is available for this first partial stroke, so that this first partial stroke can be carried out at low speed and therefore gently for the molded part. In this first partial stroke, it is essentially intended that a detaching and freeing of the main surfaces of the molded part from the corresponding mold walls take place, overcoming the forces of adhesion. After moving the gripping tool in, the second partial stroke of the ejecting movement can then be carried out in a very short time, because on the one hand only a remaining path distance still has to be covered and on the other hand the molded part already detached from the mold walls can be moved without risk at higher speed. By virtue of the gentle ejecting operation, it is also possible to work with relatively few ejector elements even in the case of sensitive and thin-walled molded parts.

An embodiment of the invention is explained in further detail with reference to the drawings, in which:

FIG. 1(a)–1(e) shows a diagrammatically simplified representation of the various phases of the demolding operation in the case of the process according to the invention;

The invention is explained by way of example with reference to an injection-molding machine for the molding of molded parts of plastic.

Figure 1A:
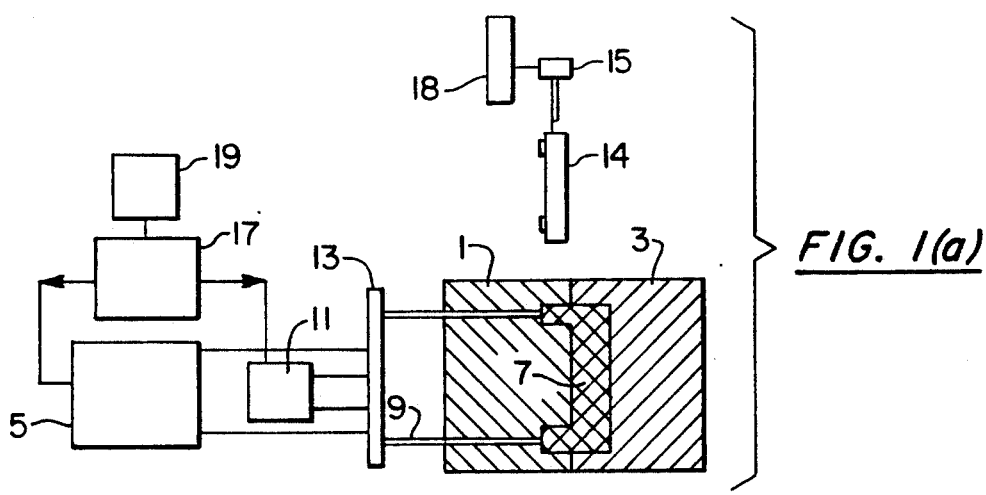

As represented in FIG. 1a, an injection mold is formed by two mold halves 1, 3, the one mold half 1 being able to be moved by a mold drive 5 in order to open the mold. The drive 5 is generally a hydraulic cylinder, but may also be a pneumatic cylinder, an electrical drive or a mechanical drive. In the mold cavity formed by the mold halves 1, 3 there is an already completely molded plastics molded part 7. Ejector pins 9, which are mounted on the mold half 1 and can be operated by an ejector drive 11 via an ejector plate 13, act on said molded part. A gripping tool 14, which is only shown diagrammatically, of a handling unit, robot, manipulator or the like can be moved by means of a gripper drive 15 in between the opened mold halves 1, 3 in order to receive the molded part 3. The ejector drive 11 and the gripper drive 15 may also be respectively designed as a hydraulic or pneumatic cylinder, an electrical or mechanical drive. The mold drive 5 and ejector drive 11 are, for example, operated in the correct functional sequence by a hydraulic control 17 in dependence on a control unit 19, whereas the gripper drive 15 of the handling unit or the like is likewise controlled by the control unit 19 or has its own control unit 18. The control units 18, 19 operate in a way known per se in dependence on position sensors, which detect the positions of the mold half 1 and the gripping tool 14 and initiate the successive movement operations, path-dependently in each case.

Figure 1B:
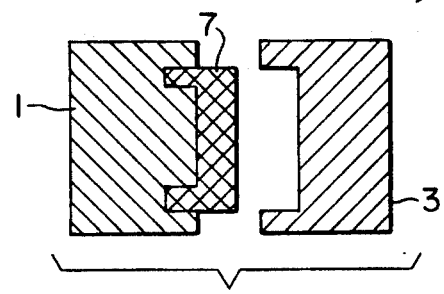
Figure 1C:
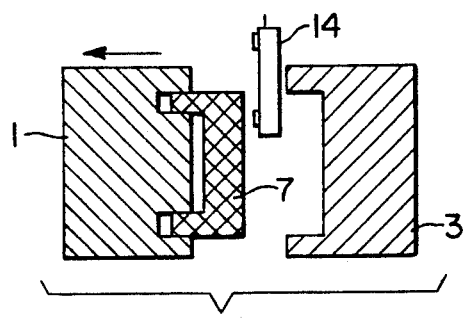
Figure 1D:
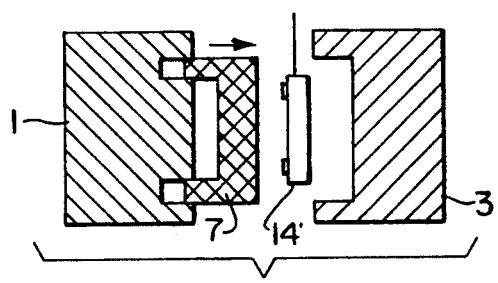

Starting from the closed position of the mold according to FIG. 1a, the demolding operation according to the invention proceeds as follows: the movable mold half 1 is moved to the left in FIG. 1 in order to open the mold (FIG. 1b). At the same time, the molded part 7 in the mold half 1 is taken along to the left and parts from the fixed mold half 3. Even during this opening movement of the mold, however, the ejector plate 13 also begins to move to the right in relation to the mold half 1, in order to detach the molded part 7 from the mold half 1 (FIG. 1c). In FIG. 1d, the mold half 1 has arrived in the final position, so that the gripping tool 14 can be moved in between the mold halves. During the moving-in movement of the gripping tool 14, the first partial stroke of the ejecting movement of the molded part 7 is completed; at this point in time, the ejector plate 13 has moved to the right by the partial-stroke distance a (cf.

Figure 2:
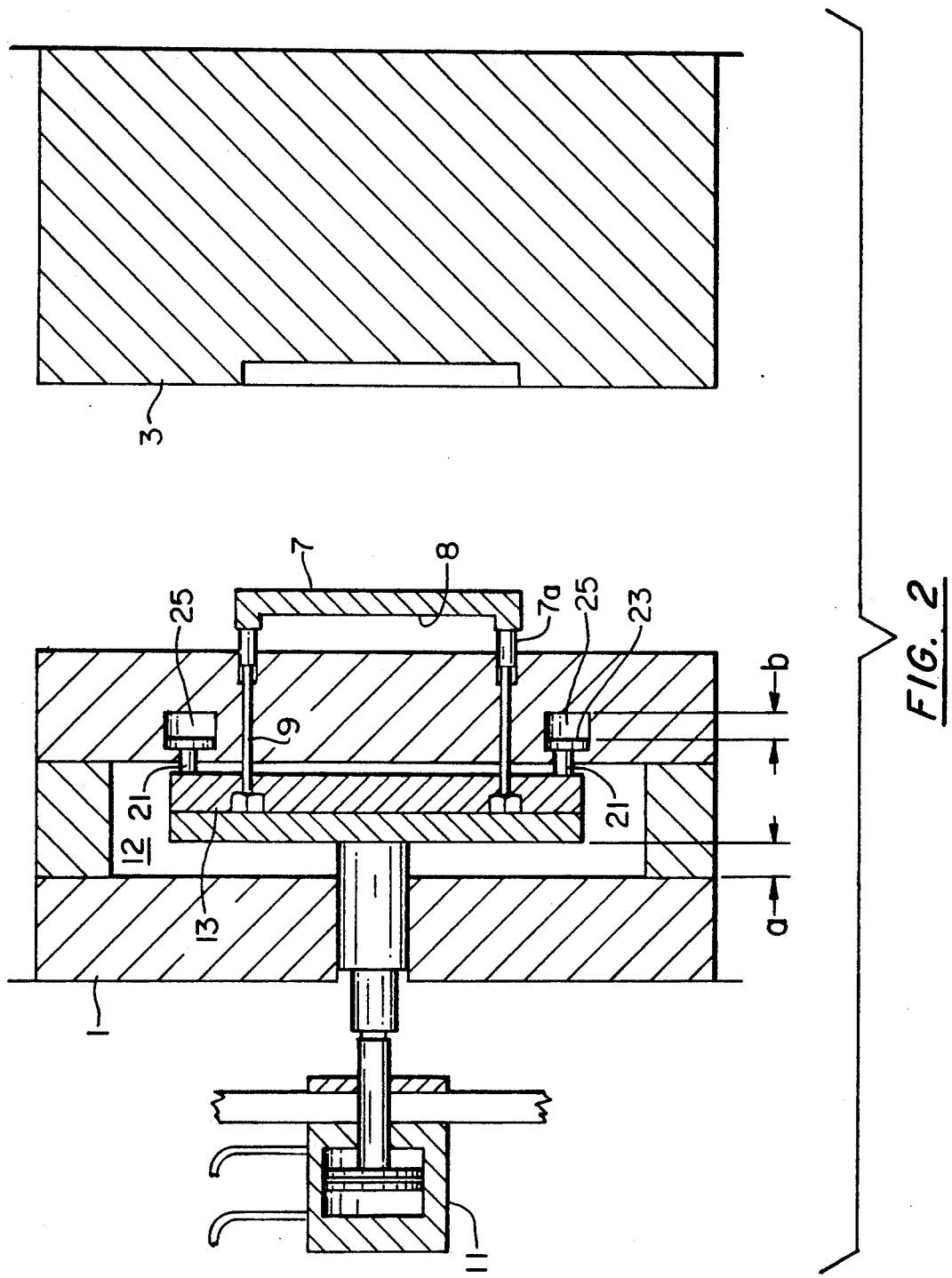
FIG. 2 shows a section through the device according to the invention in the intermediate position of the demolding operation.

FIG. 2) and brought the molded part 7 into the intermediate position, in which its main surfaces are detached from the corresponding walls of the mold half 1, but the molded part 7 still engages partially in the mold half 1 and is held by the latter in position for the gripping tool 5 (FIG. 1d).

The molded part 7 remains in the intermediate position until the gripping tool 14 has reached the completely moved-in position 14'. Then, from the position according to FIG. 1d, the second partial stroke commences, in which the ejector plate 13 is moved to the right at greater speed, in order to bring the molded part 7 out of the intermediate position according to FIG. 1d into a position completely freed from the mold half 1, with simultaneous gripping by the gripping tool 14.

Figure 1E:
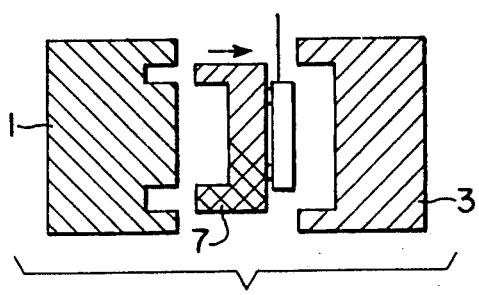

FIG. 1e shows the final position, in which the ejector plate 13 has moved over its full stroke, i.e. the sum of the partial-stroke distances a and b, and the molded part 7 is in the removal position, in which it is gripped completely by the gripping tool 14 and can then be moved out between the mold halves 1, 3.

FIG. 2 shows the opened mold in the intermediate position corresponding to FIG. 1c. The movable mold half 1 has a cavity 12, arranged in which is the ejector plate 13, which can be operated by means of the hydraulic ejector cylinder 11. Fastened to the ejector plate 13 are ejector pins 9, which act on the molded part 7, for example an injection molding. Also mounted on the mold half 1 are stop pins 21, which are connected to pistons 23 of hydraulic cylinders 25. If pressure medium is admitted to the cylinders 25 via channels (not shown), the stop pins 21 are held in a stop position, in which they project into the cavity 12 and act as stops against the front side of the ejector plate 13. The overall surface area of all the pistons 23 is greater than the effective piston area of the ejector cylinder 11. Therefore, after running through a first partial-stroke distance a, the ejector plate 13 is stopped by the stop pins 21. During this first partial stroke, the large-area surface regions 8 of the molded part 7 are detached from the corresponding wall regions of the mold half 1, and since adequate time is available for this partial stroke, it can be carried out at low speed without the molded part 7 being damaged. Projecting parts 7a of the molded part 7 still remain partially in corresponding mold depressions of the mold half 1, so that the molded part 7 is still held by the mold half 1.

At a later point in time, which corresponds to the position according to FIG. 1d, the hydraulic cylinders 25 are made pressureless, so that the stop pins 21 of the ejector plate 13 no longer offer any resistance. The ejector plate 13 can therefore move further in a second partial stroke by the distance b, this second partial stroke being controlled by the control unit 17, preferably at a higher speed than the first partial stroke. The molded part 7 moved further by the ejector pins 9 by the second partial-stroke distance b then comes completely free from the mold half 1 and is gripped by the gripping tool (not shown in FIG. 2).

Figure 3:
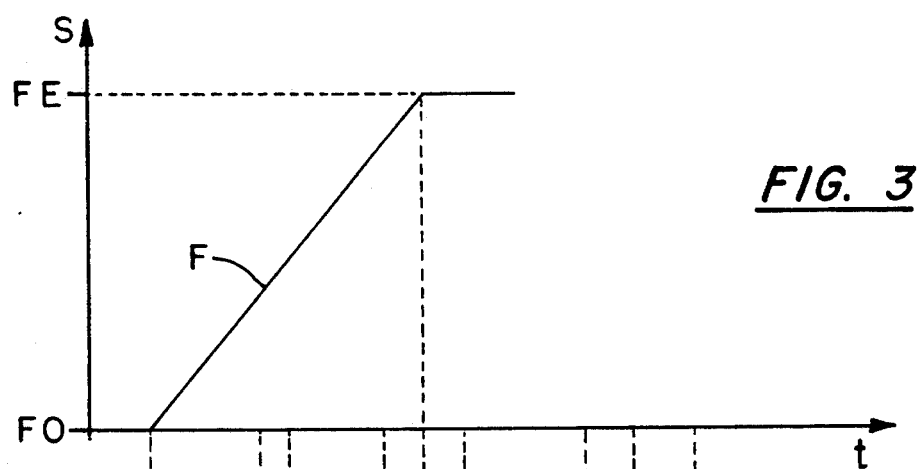
FIG. 3 shows a path-time diagram of the movements of the mold, the ejector and the gripping tool.
Figure 3:
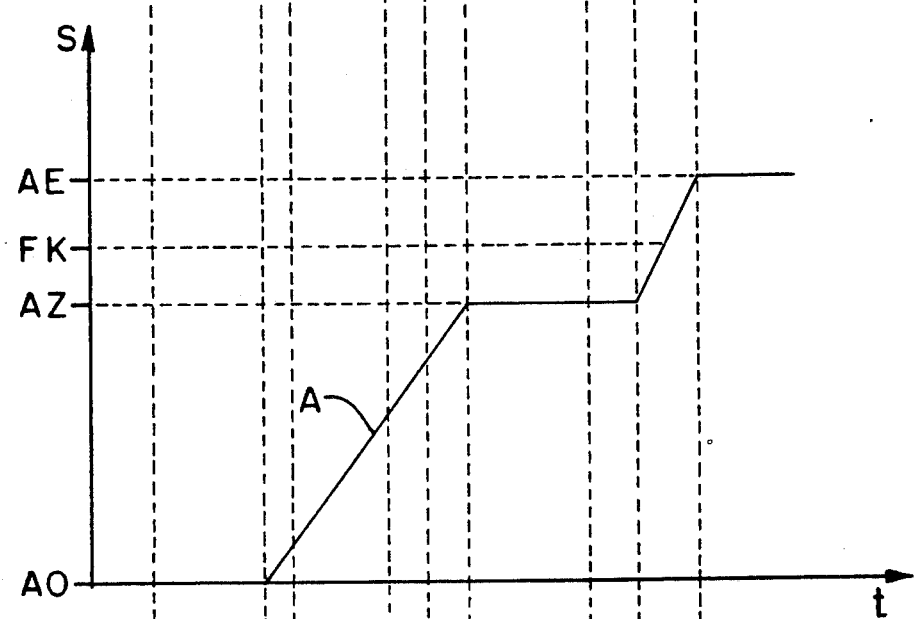
Figure 3:
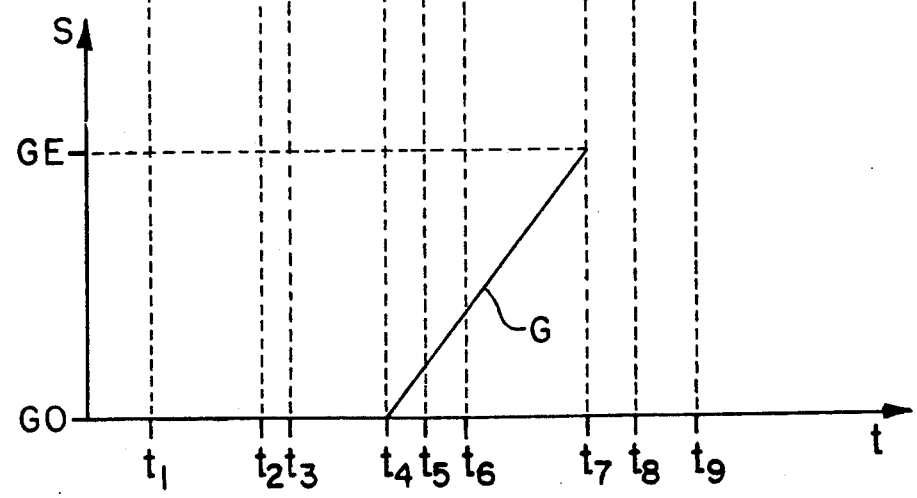

FIG. 3 shows a path-time diagram for the movements of the mold, the ejector and the gripping tool, as they can take place in the case of the process according to the invention. The time is plotted on the abscissa and the path for the mold (curve F), the ejector (curve A), and the gripping tool (curve G) are plotted on the ordinate. It is assumed for the sake of simplicity that movements at constant speed are concerned in each case, ignoring the accelerating and braking phases. The ordinates of the curves F, A and G are not to the same scale, since mold, ejector and gripping tool cover quite different path distances.

At a point in time t1, the opening of the mold commences, the movable mold half moving in accordance with the curve F from the initial position FO into the final position FE, which is reached at the point in time t5. Even during this opening movement of the mold, the ejector begins, at the point in time t2, to carry out its first partial stroke in accordance with curve A out of the initial position AO into the intermediate position AZ. In this movement, the first phase of this first partial stroke, up to a point in time t3, serves to detach the workpiece from the wall of the mold cavity, i.e. to overcome the wall adhesion, whereas from the point in time t3 the actual movement into the intermediate position AZ is performed. In this intermediate position AZ, the workpiece has not yet passed beyond the limit of the mold contour, which is indicated by the line FK, so is still held by the mold contour, preventing it from falling.

When the intermediate position AZ of the ejecting movement has been reached, or else even at an earlier point in time t4, which may even be before the end t5 of the mold-opening movement, the gripping tool begins to move out of the initial position G0 into the completely moved-in position GE, which is reached at the point in time t7. Immediately thereafter, at the point in time t8, the second partial stroke of the ejecting movement commences, by which the workpiece is moved out of the intermediate position AZ, going beyond the mold contour FK, into the removal position AE with simultaneous gripping by the gripping tool. The dwell time of the ejector in the intermediate position from t6 to t8 should be set such that the time tolerances, unavoidable in practice, for the moving-in movement of the gripping tool are compensated.

Deviations from the described embodiment are possible. For instance, instead of a single ejector system, in a known way two or more ejector systems, i.e groups of ejector pins actuated by separate drives, may also be provided, and the first and/or second partial stroke may be carried out by appropriate driving of only one or the other ejector system. The starting and ending times of the opening stroke, the ejecting stroke and the moving-in stroke of the gripping tool may be coordinated with one another by position control in a suitable way, for example the moving-in stroke of the gripping tool may be commenced simultaneously with the opening stroke of the mold and completed simultaneously with the first partial stroke of the opening movement. The second partial stroke of the ejecting operation may follow immediately after the first partial stroke, i.e. the molded part need not come to a standstill in the intermediate position.

In the case of the hydraulic operation described or else a pneumatic operation of the ejector, the higher speed during the second partial stroke can be produced, for example, by cutting in a pressure accumulator at the beginning of the second partial stroke, in which accumulator pressure medium is accumulated under pressure during the first partial stroke. A person skilled in the art is familiar with such pressure-medium systems and the associated switching valves.

In a further refinement of the invention, the ejector movement may also be carried out in more than two partial strokes. In particular, the first partial stroke may be divided into two steps. In this case, in the first step the molded part would only be moved slightly, to the extent that it is detached from the wall of the mold cavity, i.e. the wall adhesion is overcome. The subsequent second step of the first partial stroke then comprises the further movement of the molded piece into the intermediate position. This second step can already be carried out at greater speed than the first step, i.e. the first step of detaching the molded part from the mold wall can be carried out particularly slowly and gently. In the example of FIG. 3, this would mean that the movement a of the ejector is carried out in the first time interval from $t_2$ to $t_3$ as the first partial step at even lower speed than the remaining first partial step from $t_3$ to $t_6$.

I claim:

1. Process for demolding a molded part from a mold, in which the mold is opened by moving first and second mold halves apart and the molded part, which is located in the first mold half is moved by at least one ejector, which can be operated by an ejector plate, out of the first mold half to a removal position, in which the molded part can be gripped by a gripping tool which can be moved in between the opened mold halves, the ejector movement being carried out in at least two partial strokes and the molded part being moved in a first partial stroke to an intermediate position, in which it is still held by a mold contour of the first mold half, and is then moved in a second partial stroke to the removal position outside the mold contour, wherein the first partial stroke is commenced as early as during one of the opening movement of the mold and the moving-in movement of the gripping tool, the ejector plate is stopped at the end of the first partial stroke by at least one releasable stop, which defines the intermediate position of the mold part, and at the beginning of the second partial stroke, the stop is released and consequently the ejector plate is enabled for the second partial stroke.

2. Process according to claim 1, wherein the first partial stroke is carried out at lower speed than the second partial stroke.

3. Process according to claim 1, wherein the first partial stroke is completed before the complete moving-in of the gripping tool and there is a standstill phase between the first partial stroke and second partial stroke.

4. An apparatus for removing a molded part from a mold having first and second mold halves which can be moved relative to each other between an open position and a closed position, the apparatus comprising an ejector means arranged on the first mold half, the ejector means including at least one ejector element acting on the molded part, an ejector drive for driving the at least one ejector element, and a drive control for controlling the ejector drive in a time sequence which is coordinated with the opening movement of the mold halves, the ejector drive having opposite front and rear sides, and at least one releasable stop means for stopping the ejector means after a first partial stroke in an intermediate position when the molded part is not freed from the mold, and for subsequently releasing the ejector means to move in a second partial stroke to act on the molded part, the release of the stop means being controlled by the drive control.

5. An apparatus according to claim 4, wherein the ejector means includes an ejector plate having a front side, and the at least one releasable stop means is connected to at least one hydraulically actuable stop piston having a rear side which acts against the front side of the ejector plate.

6. An apparatus according to claim 5, wherein the ejector drive includes at least one hydraulic piston-cylinder arrangement, the overall surface area of the at least one hydraulically actuable stop piston being greater than the overall surface area of the pistons in the at least one hydraulic piston-cylinder arrangement.

7. An apparatus according to claim 6, wherein the drive control controls the pressurization of the at least one hydraulically actuable stop piston during the first partial stroke and controls the pressure relief of the at least one hydraulically actuable stop piston at the beginning of the second partial stroke.

* * * * *